United States Patent
Menezes et al.

(10) Patent No.: US 10,326,738 B2
(45) Date of Patent: *Jun. 18, 2019

(54) TRUST STATUS OF A COMMUNICATION SESSION

(71) Applicant: Microsoft Technology Licensing, LLC, Redmond, WA (US)

(72) Inventors: Pascal Francis Menezes, Bellevue, WA (US); Gunter Leeb, Redmond, WA (US); Amer Aref Hassan, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,752

(22) Filed: Apr. 9, 2018

(65) Prior Publication Data

US 2018/0234391 A1    Aug. 16, 2018

Related U.S. Application Data

(63) Continuation of application No. 14/848,051, filed on Sep. 8, 2015, now Pat. No. 9,942,202.

(51) Int. Cl.
| | |
|---|---|
| *H04L 12/18* | (2006.01) |
| *H04L 29/06* | (2006.01) |
| *H04L 29/08* | (2006.01) |
| *H04W 12/06* | (2009.01) |
| *H04L 12/26* | (2006.01) |
| *H04L 12/58* | (2006.01) |

(Continued)

(52) U.S. Cl.
CPC .......... *H04L 63/04* (2013.01); *H04L 12/1822* (2013.01); *H04L 29/08576* (2013.01); *H04L 29/08819* (2013.01); *H04L 43/10* (2013.01); *H04L 51/24* (2013.01); *H04L 63/10* (2013.01); *H04L 63/1425* (2013.01); *H04L 63/18* (2013.01); *H04L 65/1069* (2013.01); *H04L 65/1076* (2013.01); *H04L 67/146* (2013.01); *H04W 12/06* (2013.01); *H04L 45/38* (2013.01); *H04L 47/2483* (2013.01); *H04L 67/14* (2013.01)

(58) Field of Classification Search
CPC ..... H04L 63/04; H04L 63/1425; H04L 63/10; H04L 65/1069
See application file for complete search history.

(56) References Cited

U.S. PATENT DOCUMENTS

| | | | |
|---|---|---|---|
| 8,452,956 B1 * | 5/2013 | Kersey ................ | H04L 63/0428 713/153 |
| 8,793,383 B2 * | 7/2014 | Barchi .................... | H04L 51/04 709/227 |
| 9,094,256 B1 * | 7/2015 | Ress ....................... | H04L 29/06 |

(Continued)

*Primary Examiner* — Joseph P Hirl
*Assistant Examiner* — Stephen T Gundry
(74) *Attorney, Agent, or Firm* — NovotechIP International PLLC

(57) ABSTRACT

Techniques for trust status of a communication session are described. According to various embodiments, different networks cooperate to facilitate routing of communication sessions between different devices. According to various embodiments, a network involved in routing a communication session ascertains whether an authentication status of a communication session is received, and categorizes a trust status of the communication session accordingly.

20 Claims, 11 Drawing Sheets

(51) Int. Cl.
*H04L 12/721* (2013.01)
*H04L 12/851* (2013.01)

(56) References Cited

U.S. PATENT DOCUMENTS

| | | | | |
|---:|---|---|---|---|
| 9,176,838 B2* | 11/2015 | Li | ............................ | G06F 11/30 |
| 9,185,562 B2* | 11/2015 | Reddy | ................... | H04W 12/08 |
| 9,436,820 B1* | 9/2016 | Gleichauf | ............... | G06F 21/50 |
| 9,667,635 B2* | 5/2017 | Byers | ................... | H04L 63/0884 |
| 2009/0006841 A1* | 1/2009 | Ormazabal | ......... | H04L 63/1458 |
| | | | | 713/152 |
| 2009/0300207 A1* | 12/2009 | Giaretta | .............. | H04L 12/1403 |
| | | | | 709/232 |
| 2010/0202450 A1* | 8/2010 | Ansari | ................... | G06Q 30/04 |
| | | | | 370/389 |
| 2014/0096198 A1* | 4/2014 | Brunson | ............. | H04L 63/0281 |
| | | | | 726/4 |
| 2014/0149572 A1* | 5/2014 | Menezes | ................. | H04L 43/12 |
| | | | | 709/224 |
| 2014/0289826 A1* | 9/2014 | Croome | ................ | H04L 67/141 |
| | | | | 726/5 |
| 2014/0310416 A1* | 10/2014 | Durbha | ................... | H04L 47/70 |
| | | | | 709/225 |
| 2015/0026756 A1* | 1/2015 | Reddy | ................... | H04W 12/08 |
| | | | | 726/1 |
| 2015/0172314 A1* | 6/2015 | Mononen | ............ | H04L 63/1416 |
| | | | | 726/8 |
| 2016/0080343 A1* | 3/2016 | Robinton | .............. | H04W 12/04 |
| | | | | 726/4 |
| 2016/0099916 A1* | 4/2016 | Glazemakers | ........ | H04L 63/029 |
| | | | | 726/12 |
| 2016/0099917 A1* | 4/2016 | Glazemakers | ...... | H04L 63/0272 |
| | | | | 726/12 |
| 2016/0105780 A1* | 4/2016 | Hooker | .............. | H04L 65/1016 |
| | | | | 370/338 |
| 2016/0156691 A1* | 6/2016 | Leeb | ....................... | H04L 65/80 |
| | | | | 709/225 |
| 2016/0182518 A1* | 6/2016 | Smith | ..................... | H04L 63/10 |
| | | | | 726/3 |
| 2016/0226937 A1* | 8/2016 | Patel | ................... | H04L 65/4061 |
| 2016/0285891 A1* | 9/2016 | Byers | ................. | H04L 63/0884 |
| 2017/0006033 A1* | 1/2017 | Stecher | ................... | H04L 63/10 |

* cited by examiner

TRUST STATUS OF A COMMUNICATION SESSION

RELATED APPLICATIONS

This application is a continuation of and claims priority to U.S. patent application Ser. No. 14/848,051, entitled "Trust Status of a Communication Session" and filed Sep. 8, 2015, the disclosure of which is incorporated by reference herein in its entirety.

BACKGROUND

Modern communication systems have an array of capabilities, including integration of various communication modalities with different services. For example, systems that enable users to share and collaborate in creating and modifying various types of documents and content may be integrated with multimodal communication systems providing different kinds of communication and collaboration capabilities. Such integrated systems are sometimes referred to as Unified Communication (UC) systems.

While UC systems provide for increased flexibility in communications, they also present a number of implementation challenges. For instance, UC data flows are typically routed over networks that are unaware of attributes of the individual flows. Thus, challenges arise in authenticating UC media flows and enforcing security policies for different networks that carry UC media flows.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for trust status of a communication session are described. According to various embodiments, different networks cooperate to facilitate routing of communication sessions between different devices. According to various embodiments, a network involved in routing a communication session ascertains whether an authentication status of a communication session is received, and categorizes a trust status of the communication session accordingly.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
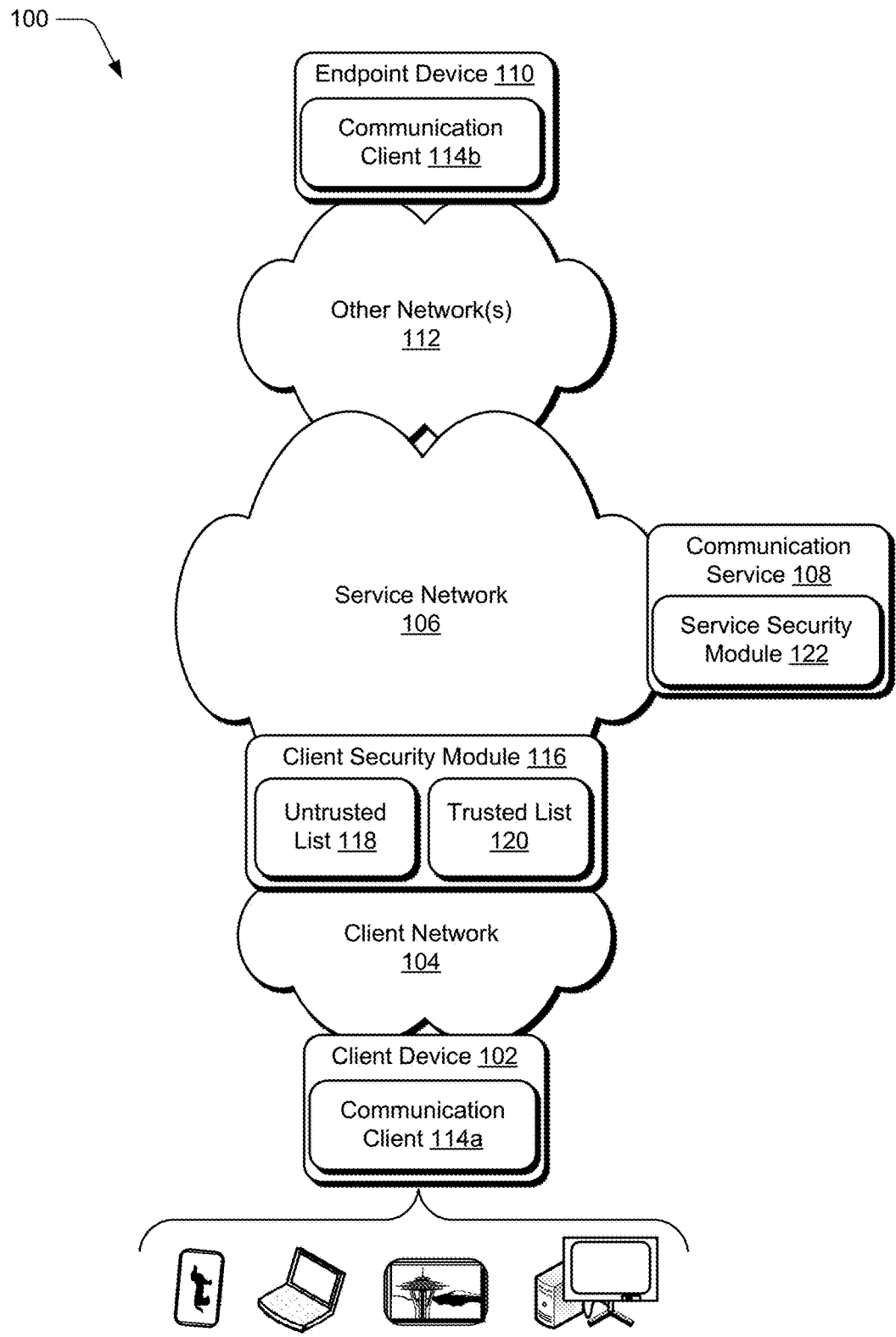
FIG. 1 is an illustration of an environment in an example implementation that is operable to employ techniques discussed herein.

Techniques for trust status of a communication session are described. A communication session, for instance, represents an exchange of communication media between different nodes in a network. Examples of a communication session include a Voice over Internet Protocol (VoIP) call, a video call, text messaging, a file transfer, and/or combinations thereof. In at least some embodiments, a communication session represents a Unified Communication (UC) session.

According to various implementations, different networks cooperate to facilitate routing of communication sessions between different devices. For instance, a client network interfaces with a service network to enable initiation and management of communication sessions. Generally, the client network represents a local network that provides network connectivity within a particular region, such as an enterprise facility. The service network represents a network implemented and managed by a communication service, such as a cloud-based UC network that manages communication sessions for multiple different client networks. Accordingly, a client device connected to the client network can participate in a communication session by transmitting communication media across the client network to the service network for receipt by another device participating in the communication session.

According to various implementations, a client network handles data flows of communication sessions based on whether the communication sessions are authenticated with a communication service. For instance, when a communication session is first initiated in the client network, the client network handles the communication session as an untrusted data flow and monitors for a verification that the communication session is authenticated with a communication service. If the client network receives a notification that the communication session is authenticated with a communication service, the client network categorizes the communication session as a trusted data flow within the client network.

If the client network does not receive a verification of an authenticated status of the communication session, the client network handles a data flow of the communication session as an untrusted data flow. An untrusted data flow may be handled in various ways, such as by throttling network resources (e.g., bandwidth) allocated to the data flow, terminating the data flow, and so forth.

In at least some implementations, an untrusted data flow may represent an attempt by an unauthorized entity to utilize resources of a client network and/or a service network. For instance, an entity may attempt to utilize an untrusted data flow to engage in malicious activity within a particular client network and/or across multiple different networks.

Accordingly, techniques described herein provide for secure management of communication session media flows between different networks and assist in preventing and/or mitigating the harmful effects of malicious activities that may result from untrusted data flows. Thus, a private network can leverage services provided by a cloud-based communication service while minimizing security risks involved in exposing local network resources to data flows from external networks.

In the following discussion, an example environment is first described that is operable to employ techniques described herein. Following this, a section entitled "Propagating Attributes of Communication Sessions" discusses some example ways for notifying different communication components of attributes of communication sessions. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for trust status of a communication session described herein. Generally, the environment 100 includes various devices, services, and networks that enable communication via a variety of different modalities. For instance, the environment 100 includes a client device 102 connected to a client network 104. The client device 102 may be configured in a variety of ways, such as a traditional computer (e.g., a desktop personal computer, laptop computer, and so on), a mobile station, an entertainment appliance, a smartphone, a netbook, a game console, a handheld device (e.g., a tablet), and so forth.

The client network 104 is representative of a local network that provides the client device 102 with connectivity to various networks and/or services. For instance, the client network 104 represents a wide area network (WAN) for a particular entity, such as an enterprise entity, an education entity, a government entity, and so forth. The client network 104 may be implemented according to various architectures and/or protocols, such as a virtual private network (VPN), a multiprotocol label switching (MPLS) network, and so forth. Further, the client network 104 may provide the client device 102 with connectivity via a variety of different connectivity technologies, such as broadband cable, digital subscriber line (DSL), wireless data connectivity (e.g., WiFi™), T-carrier (e.g., T1), Ethernet, and so forth. In at least some implementations, the client network 104 is implemented and managed at least in part as a software defined network (SDN).

The environment 100 further includes a service network 106 implemented by a communication service 108. Generally, the communication service 108 is representative of a service to perform various tasks for management of communication between the client device 102 and an endpoint device 110. The endpoint device 110 is representative of any device with which the client device 102 may exchange data, such as an end-user device connected to other network(s) 112. The communication service 108, for instance, can manage initiation, moderation, and termination of communication sessions. Examples of the communication service 108 include a UC service, a VoIP service, an online conferencing service, and so forth. In at least some embodiments, the communication service 108 may be implemented as or be connected to a private branch exchange (PBX) in communication with a Public Switched Telephone Network ("PSTN") to enable voice communication between the client device 102 and the endpoint device 110.

In at least some implementations, the client device 102 is configured to interface with the communication service 108 via a communication client 114a to enable communication between the client device 102 and the endpoint device 110. The communication client 114a is representative of functionality (e.g., an application and/or service) to enable different forms of communication via the client device 102. Examples of the communication client 114a include a voice communication client (e.g., a VoIP client), a video communication client, a messaging application, a content sharing application, and combinations thereof. The communication client 114a, for instance, enables different communication modalities to be combined to provide diverse communication scenarios.

According to one or more implementations, the communication client 114a represents an application that is installed on the client device 102. Additionally or alternatively, the communication client 114a can be implemented as a remote application, such as accessed via a web browser, a web application, and so forth.

The endpoint device 110 includes a communication client 114b, which represents an instance of the communication client 114a that can be leveraged by the endpoint device 110 to communicate with other devices. For instance, a communication session between the client device 102 and the endpoint device 110 represents an exchange of communication media between the communication client 114a and the communication client 114b.

The client network 104 includes a client security module 116, which is representative of functionality for providing various security-related services. For example, the client security module 116 ascertains whether media flows across the client network 104 are trusted or untrusted, and manages the media flows accordingly. To this end, the client security module 116 maintains an untrusted list 118 and a trusted list 120. The untrusted list 118 is used to track and identify media flows that are unauthenticated and/or untrusted. The trusted list 120 is used to track and identify media flows that are authenticated and/or trusted. The discussion below provides more detail concerning usage of the untrusted list 118 and the trusted list 120.

A service security module 122 represents functionality for providing security-related services for the communication service 108. The service security module 122, for instance, enforces security policies to ensure that unauthenticated flows are restricted and/or prohibited from accessing the service network 106. Further, the service security module 122 implements processes for preventing an unauthenticated media flow from mimicking a media flow that is authenticated with the communication service 108 across other networks that interface with the service network 106.

While the environment 100 is discussed with reference to a particular instance of the client device 102 and the endpoint device 110, it is to be appreciated that techniques for trust status of a communication session described herein can be employed to route communication data for many different devices and networks in accordance with the claimed embodiments.

Having described an example environment in which the techniques described herein may operate, consider now a discussion of example ways of propagating various attributes of communication sessions in communication systems in accordance with one or more embodiments.

Propagating Attributes of Communication Sessions

According to various embodiments, techniques can be employed to dynamically enlighten various network components with information about communication sessions. For instance, notification events can be generated that include various attributes of communication sessions. The notification events can be propagated to different entities further to techniques for trust status of a communication session discussed herein.

In at least some embodiments, notification events can be configured using a communication application programming interface (API) that can be leveraged to configure and communicate session information to various network components involved in a communication session. For example, the communication API can identify dialogue events and session events for which attributes of a communication session can be identified. Consider, for instance, the following events and attributes that may be conveyed via a notification event generated by the communication API:

Dialogue Events—

These events apply to various portions of a communication session, such as the start, update, and end of a communication session. A dialogue event can include one or more of the following example attributes.

(1) Timestamp: This attribute can be leveraged to specify timestamps for a start of a communication session, updates that occur during a communication session, and an end (e.g., termination) of a communication session.

(2) Source IP Address: This attribute can be leveraged to specify an IP address for a device that is a source of media during a communication session, e.g., a device that initiates a communication session.

(3) Destination IP Address: This attribute can be leveraged to specify an IP address for a device that is to receive media as part of a communication session.

(4) Transport Type: This attribute can be leveraged to specify a transport type or combination of transport types for a communication session. Examples of transport types include Transmission Control Protocol (TCP), User Datagram Protocol (UDP), and so forth.

(5) Source Port: this attribute can be leveraged to specify an identifier for a port at a source device, e.g., a source device identified by the Source IP Address referenced above.

(6) Destination Port: This attribute can be leveraged to specify an identifier for a port at a destination device, e.g., a destination device identified by the Destination IP Address referenced above.

(7) Media Type: This attribute can be leveraged to specify a media type and/or types that are to be transmitted and/or are being transmitted as part of a communication session. As discussed elsewhere herein, the communication session can involve multiple different types of media. Thus, the Media Type attribute can be employed to identify media types in a communication session, such as for applying the service policies discussed herein.

(8) Bandwidth Estimation: This attribute can be leveraged to specify an estimated bandwidth that is to be allocated for a communication session. The estimated bandwidth, for instance, can be based on various factors, such as a privilege level associated with a user, type and/or types of media included in a communication session, and so forth.

(9) To: This attribute can be leveraged to identify a user to which media in a communication session is to be transmitted.

(10) From: This attribute can be leveraged to identify a user from which media and a communication session is transmitted.

(11) Error Code: This attribute can be leveraged to specify various error codes for pairs that may occur as part of a communication session. For example, errors can include errors that occur during initiation the communication session, errors that occurred during a communication session, errors that occur when a communication session is terminated, and so forth.

Session Problem Events—

These events can be generated and applied when a communication session experiences errors, performance degradation, and so forth. A session problem event may include one or more of the attributes discussed above with reference to Dialogue Events, and may also include one or more of the following attributes.

(1) Mean Opinion Score (MOS) Degradation: This attribute can be leveraged to specify a MOS for a communication session. The attribute, for instance, can be used to indicate that an overall quality of a communication session has decreased.

(2) Jitter Inter-Arrival Time: This attribute can be leveraged to specify jitter values for a communication session. The attribute, for instance, can be used to indicate that a jitter value or values have increased, e.g., have exceeded a specified jitter value threshold.

(3) Packet Loss Rate: This attribute can be leveraged to specify a packet loss rate for a communication session. The attribute, for instance, can be used to indicate that a packet loss rate has increased, e.g., has exceeded a specified packet loss rate value threshold.

(4) Round Trip Delay (RTD): This attribute can be leveraged to specify RTD values for packets in communication sessions. The attribute, for instance, can be used to indicate that RTD values for packets have increased, e.g., have exceeded a specified RTD value threshold.

(5) Concealment Ratio: This attribute can be leveraged to specify a cumulative ratio of concealment time over speech time observed after starting a communication session. The attribute, for instance, can be used to specify that a concealment ratio has increased, e.g., has exceeded a specified concealment ratio value threshold.

Thus, various notifications discussed herein can include one or more of the attributes discussed above and can be used to propagate the attributes to various entities.

Having described an example ways of propagating attributes of communication sessions, consider now some example implementation scenarios for trust status of a communication session in accordance with one or more embodiments.

Example Implementation Scenarios

The following section describes example implementation scenarios for trust status of a communication session in accordance with one or more embodiments. The implementation scenarios may be implemented in the environment 100 discussed above, and/or any other suitable environment.

Figure 2:
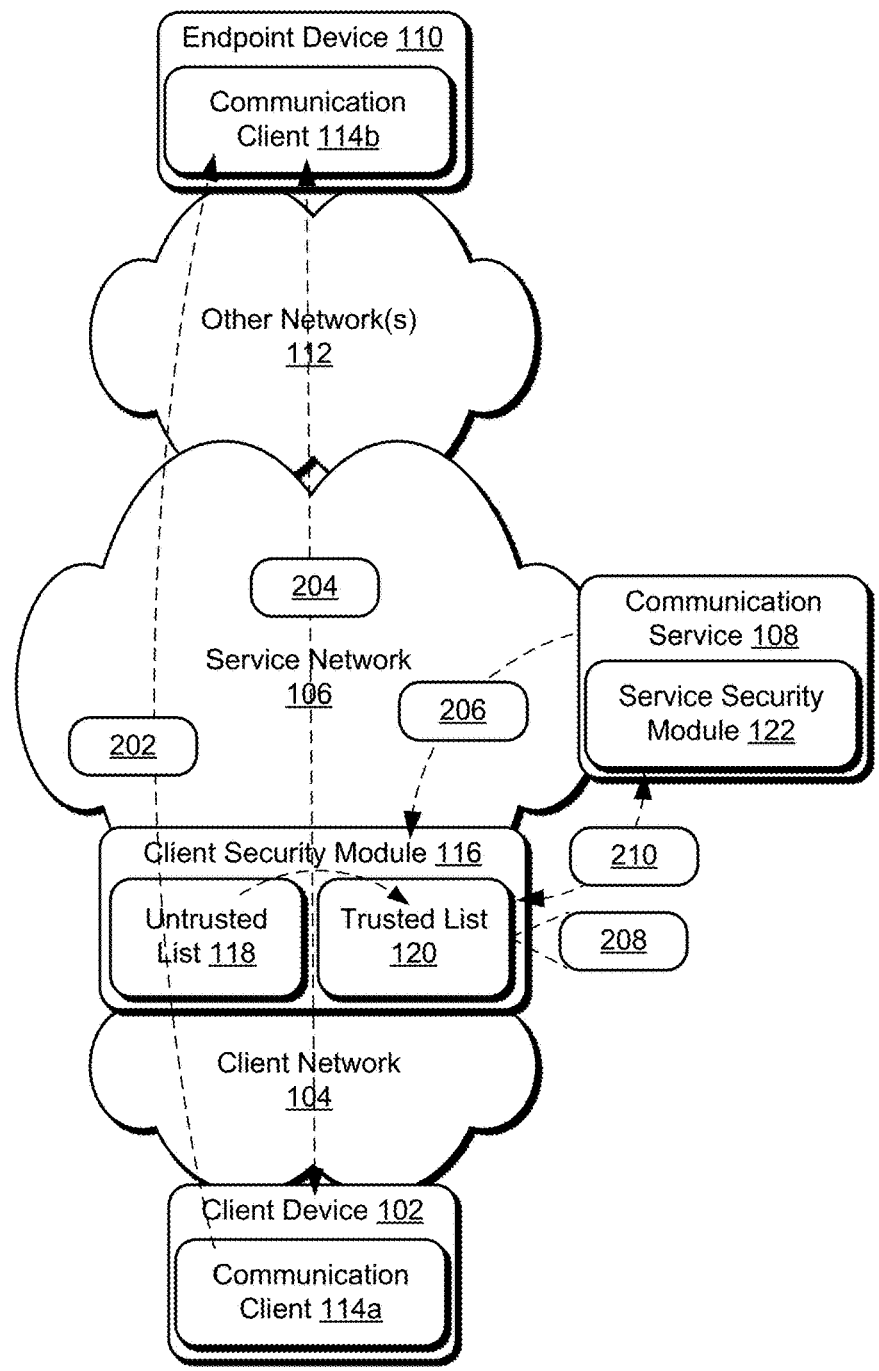
FIG. 2 illustrates an example implementation scenario for categorizing a trust status of a communication session in accordance with one or more embodiments.

FIG. 2 illustrates an example implementation scenario 200 for categorizing a trust status of a communication session in accordance with one or more implementations. The scenario 200 includes various entities and components introduced above with reference to the environment 100.

In the scenario 200, a user of the client device 102 performs an action to initiate a communication session between the communication client 114a of the client device 102 and the communication client 114b of the endpoint device 110. For instance, the user selects an indicia indicating a request to initiate a communication session, such as by entering a phone number for the endpoint device 110, selecting a contact from a contact list, selecting a hyperlink for the communication client 114b, and so forth.

Accordingly, a session request 202 is communicated from the client device 102 to the endpoint device 110. Generally, the session request 202 indicates a request to initiate a communication session, and includes various signaling information pertaining to the request. In at least some implementations, some portions of the session request 202 are encrypted, while other portions may be in the clear, e.g., not encrypted. The session request 202, for instance, may include information to establish a Transmission Control Protocol (TCP) connection between the client device 102 and the endpoint device 110. For example, the session request 202 includes 5-tuple information for establishing a TCP connection, such as a protocol identifier, a source IP address and a source port identifier for the client device 102, and a target IP address and a target port identifier for the endpoint device 110.

Further to the scenario 200, the client security module 116 inspects the session request 202 (e.g., the 5-tuple information) and allows the session request 202 to pass from the client network 104 to the service network 106. The client security module 116, for instance, allows the session request 202 to traverse from the client network 104 to the service network 106 as it would other data flows, such as a Transport Layer Security (TLS) flow, a Hypertext Transfer Protocol Secure (HTTPS) flow, and so forth.

In at least some implementations, the client security module 116 monitors the session request 202 for abnormal behavior that may indicate that the session request 202 is associated with possible malicious behavior, such as a Denial of Service (DoS) attack that targets the client network 104 and/or the communication service 108. The client security module 116, for instance, knows that the session request 202 represents signaling to initiate a communication session, and thus should not exceed a specified threshold bandwidth. If the session request 202 exceeds the threshold bandwidth, the client security module 116 can take one or more actions, such as terminating the data flow of the session request 202, throttling the bandwidth allocated to the session request 202 across the client network 104, notifying the communication service 108 that the session request 202 may be associated with a malicious activity, and so forth. In this particular scenario, the client security module 116 does not detect abnormal behavior with the session request 202, and thus allows the session request 202 to pass unimpeded from the client network 104 on to the service network 106.

Proceeding with the scenario 200, the session request 202 traverses the service network 106 and the other network 112 and is received at the endpoint device 110. The endpoint device 110 accepts the session request 202 and thus a communication session 204 is established between the client device 102 and the endpoint device 110. Generally, the communication session 204 involves an exchange of communication media, such as voice media, video media, content sharing, and so forth. The communication session 202, for instance, represents a UC data flow between the communication client 114a and the communication client 114b.

According to various implementations, when the communication session 204 is initially established, the client security module 116 places the communication session 204 into the untrusted list 118. The client security module 116, for instance, does not know whether the communication session 204 is authenticated with the communication service 108, and thus tags the data flow of the communication session 204 as an untrusted flow. Thus, the communication session 204 is initially permitted to flow across the client network 104 but as an untrusted data flow.

Further to the scenario 200, the communication session 202 is implemented via interaction between the communication clients 114a, 114b and the communication service 108. For instance, the communication service 108 manages initiation of the communication session 204. The communication service 108, for example, ascertains that the communication clients 114a, 114b are authenticated clients of the communication service 108, and thus are permitted to utilize the communication service 108 for a communication session.

Accordingly, in response to initiation of the communication session 204, the communication service 108 communicates a session notification 206 to the client security module 116. Generally, the session notification 206 notifies the client security module 116 that the communication session 204 is authenticated with the communication service 108. The session notification 206 also includes various attributes of the communication session 204.

The session notification 206, for instance, is generated using the communication API described above, and thus can be populated with values for the various events and attributes described with reference to the communication API. For example, the session notification 206 includes identifiers for the client device 102 and the endpoint device 110, and specifies media types that are involved in the communication session 204.

In response to receiving the session notification 206, the client security module 116 performs a remarking 208 of the communication session 204 from an untrusted data flow to a trusted data flow. Accordingly, the client security module 116 moves the communication session 204 from the untrusted list 118 to the trusted list 120. For instance, the client security module 116 ascertains based on the session notification 206 that the communication session 204 is an authenticated flow, and thus marks the communication session 204 as a trusted data flow. Accordingly, the communication session 204 is permitted to traverse the client network 104 as a trusted data flow.

According to various implementations, the client security module 116 waits for a specified period of time after initiation of a communication session to receive a verification that the communication session is an authenticated session. If the client security module 116 doesn't receive such verification (e.g., the session notification 206) within the specified period of time, the client security module performs an action in relation to the communication session. Examples of such actions include throttling network resources (e.g., bandwidth) allocated to the communication session, terminating the communication session, notifying the communication service 108 of the unauthenticated communication session, and so forth.

Further to the scenario 200, the client security module 116 and the communication service 108 exchange status messages 210 with one another while the communication session 204 is in progress. The status messages 210, for instance, represent "keep-alive" packets exchanged between the communication service 108 and the client security module 116. Generally, the status messages 210 include various state indicators for a state of the communication session 204 at different times. A status message 210 from the client security module 116, for instance, may specify network conditions for the communication session 204.

Further, a status message 210 from the communication service 108 to the client security module 116 may identify media quality observed for the communication session 204. For instance, one or more of the communication clients 114a, 114b may report a problem with session quality to the communication service 108. Examples of a session quality problem include jitter, packet delay, packet loss, and so forth. Accordingly, the communication service 108 communicates a status message 210 to the client security module 116 indicating the session quality problem. A status message 210, for instance, may be generated using the communication API described above, such as via the session problem event. Accordingly, the client security module 116 can take an action based on the status message 210, such as notifying traffic routing functionality of the client network 104 of the quality problem. The traffic routing functionality may perform a procedure to improve session quality for the communication session 204, such as rerouting the communication session 204 across a different routing path within the client network 104.

In at least some implementations, the status messages 210 represent keep-alive packets that are sent by the client security module 116 to the communication service 108 on a periodic basis and while the communication session 204 is in progress. If the communication service 108 fails to receive a status message 210 after a certain elapsed period of time, the communication service 108 may notify the client security module 116 and/or other functionality of the client network 104 that a possible problem exists with connectivity for the communication session 204. Thus, an action may be taken based on this notification, such as rerouting the communication session 204 across a different network path and/or network.

Alternatively or additionally, the status messages 210 represent keep-alive packets that are sent by the communication service 108 to the client security module 116 on a periodic basis and while the communication session 204 is in progress. If the client security module 116 fails to receive a status message 210 after a certain elapsed period of time, the client security module 116 may notify the communication service 108 and/or other functionality of the client network 104 that a possible problem exists with connectivity for the communication session 204. Thus, an action may be taken based on this notification, such as rerouting the communication session 204 across a different network path and/or network.

Figure 3:
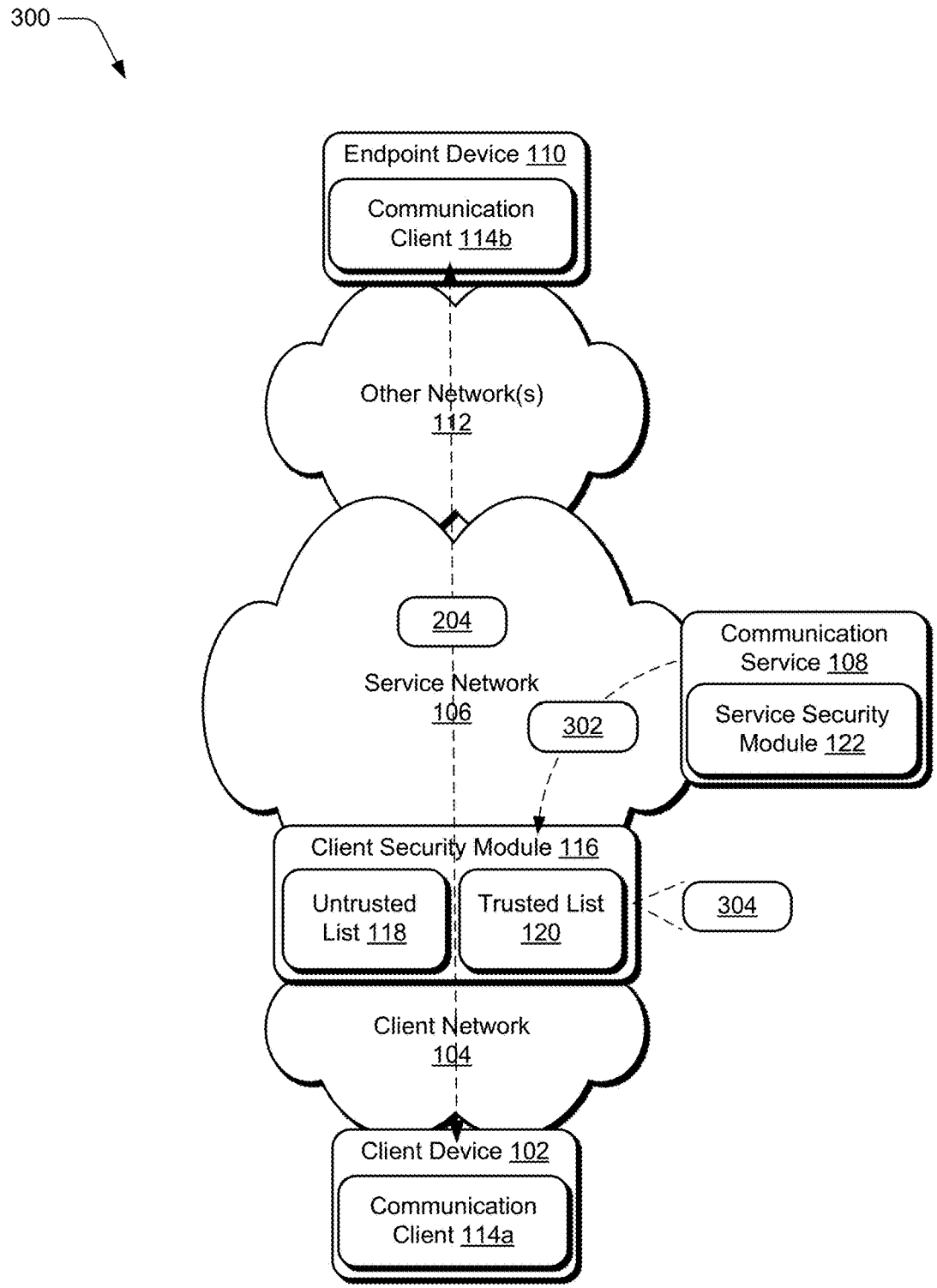
FIG. 3 illustrates an example implementation scenario for terminating a communication session in accordance with one or more embodiments.

FIG. 3 illustrates an example implementation scenario 300 for terminating a communication session in accordance with one or more implementations. The scenario 300 includes various entities and components introduced above with reference to the environment 100. In at least some implementations, the scenario 300 represents an extension of the scenario 200 described above.

In the scenario 300, the communication session 204 is terminated. A user of the communication client 114a or communication client 114b, for instance, selects an indicia to terminate ("hang up") the communication session 204. Accordingly, the communication service 108 communicates a termination notification 302 to the client security module 116. Generally, the termination notification 302 notifies the client security module 116 that the communication session 204 is terminated. The termination notification 302 also includes various attributes of the communication session 204.

The termination notification 302, for instance, is generated using the communication API described above, and thus can be populated with values for the various events and attributes described with reference to the communication API. For example, the termination notification 302 includes identifiers for the client device 102 and the endpoint device 110, and indicates that the communication session 204 is terminated.

Thus, the client security module 116 performs a remarking 304 of the communication session 204 from a trusted data flow to an untrusted data flow. Accordingly, the client security module 116 moves the communication session 204 from the trusted list 120 to the untrusted list 118. For instance, the client security module 116 ascertains based on the termination notification 302 that the communication session 204 is no longer an authenticated flow with the communication service 108, and thus marks the communication session 204 as an untrusted data flow.

Accordingly, the client security module 116 handles the communication session 204 as an untrusted data flow. For instance, if the data flow of the communication session 204 continues for a specified period of time after receiving the termination notification 302, the client security module 116 may automatically terminate the data flow. According to various implementations, this prevents an unauthorized entity from attempting to spoof an authenticated data flow, such as by using data flow information from a previously authenticated data flow that is terminated.

Figure 4:
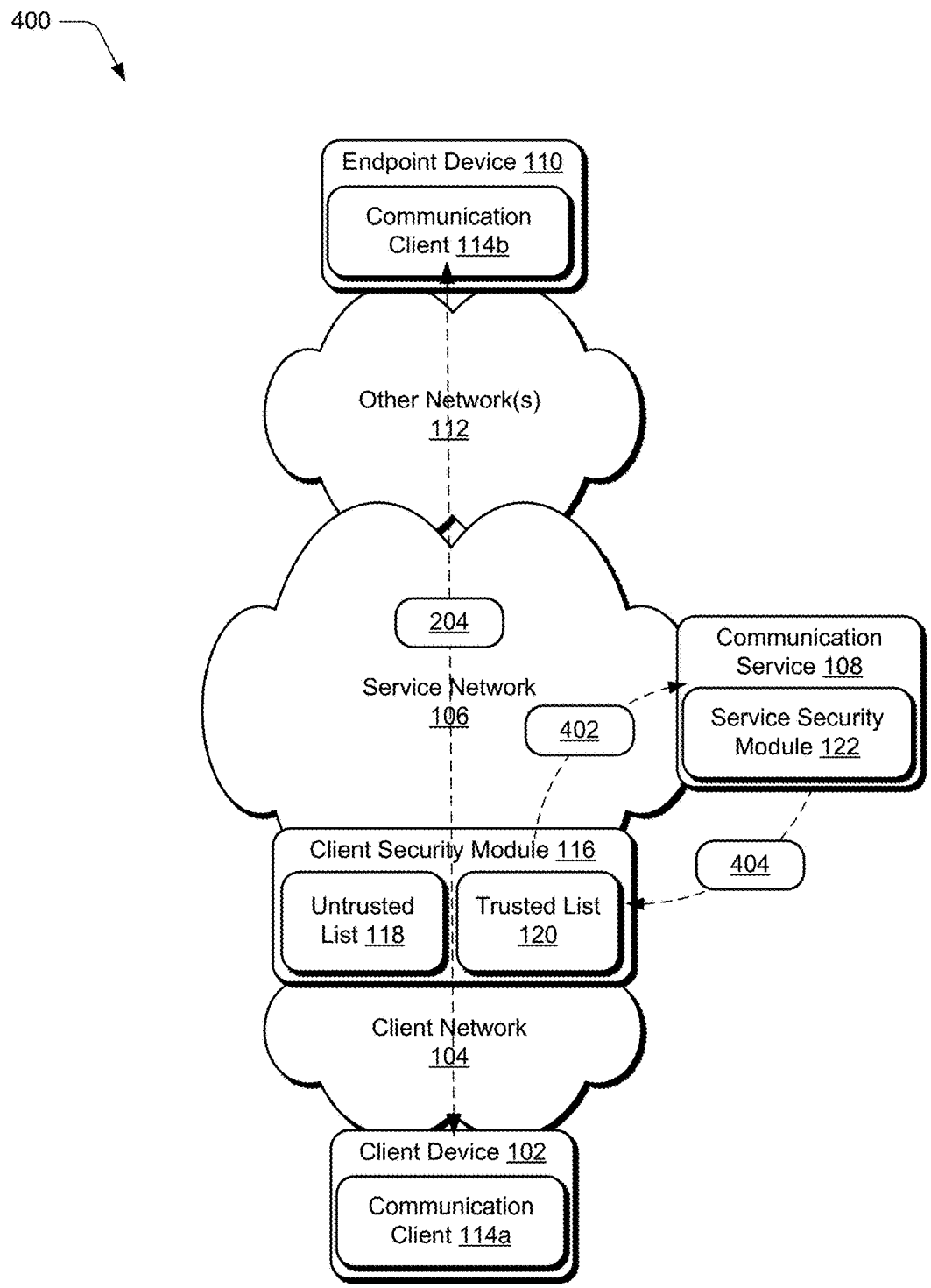
FIG. 4 illustrates an example implementation scenario for handling an untrusted communication session in accordance with one or more embodiments.

FIG. 4 illustrates an example implementation scenario 400 for handling an untrusted communication session in accordance with one or more implementations. The scenario 400 includes various entities and components introduced above with reference to the environment 100. In at least some implementations, the scenario 400 represents a variation on the scenario 200 described above.

In the scenario 400, the communication session 204 is initially established such as described above with reference to the scenario 200. The client communication service 108, for instance, places the communication session 204 in the untrusted list 118 and waits for a subsequent notification that the communication session 204 is authenticated with the communication service 108. The client communication service 108, however, does not receive an indication that the communication session 204 is authenticated with communication service 108, e.g., does not receive the session notification 206. The communication service 108, for instance, communicates the session notification 206 for receipt by the client security module 116, but the client security module 116 does not receive the session notification

206. Various events may cause the client security module 116 to not receive the session notification 206, such as the session notification 206 being dropped by a network in transit to the client security module 116, the session notification 206 being intercepted by another entity, and so forth.

Alternatively to the session notification 206 being sent by the communication service 108 but not received by the client security module 116, the communication session 204 may represent an unauthenticated media flow. For instance, an unauthorized entity may attempt to establish a data flow by simulating a media flow that is authenticated with the communication service 108. An unauthenticated media flow, for example, may represent an attempt by an entity to engage in a malicious activity within the client network 104.

Further to the scenario 400, the client security module 116 waits for a specified period of time for the session notification 206 but does not receive the session notification 206 within the specified period of time. Accordingly, the client security module 116 communicates a session query 402 to the communication service 108. The session query 402 identifies entities involved in the communication session 204 and may also include various other attributes of the communication session 204. In at least some implementations, the session query 402 is generated using the communication API described above and thus is populated with values for at least some of the attributes described with reference to the communication API. Generally, the session query 402 notifies the communication service 108 that an unauthenticated communication session between the communication clients 114a, 114b has been initiated.

In response to receiving the session query 402, the communication service 108 ascertains whether the communication session 204 is authenticated with the communication service 108 and returns a session response 404 to the client security module 116. The session response 404, instance, indicates whether the communication session 204 is authenticated with the communication service 108.

Continuing with the scenario 400, the client security module 116 receives the session response 404 and performs an action based on whether the session response 404 indicates that the communication session 204 is authenticated. For instance, if the session response 404 indicates that the communication session 204 is an authenticated communication session, the client security module 116 marks the communication session 204 as a trusted media flow and adds the communication session 204 to the trusted list 120 as described above. The communication session 204 is then handled as a trusted data flow within the client network 104 such as discussed above with reference to the scenarios 200, 300.

If the session response 404, however, indicates that the communication session 204 is not authenticated with the communication service 108, the client security module 116 handles communication session 204 as an untrusted data flow. The client security module 116, for instance, terminates the communication session 204 automatically and in response to receiving the indication that the communication session 204 is not authenticated with the communication service 108.

According to various implementations, the scenarios described above occur in real-time and in response to initiation of a communication session. Thus, techniques described herein enable real-time verification of whether a communication session is authenticated and while the communication session is in progress. Further, the various notifications and events communicated between the client security module 116 and the communication service 108 are communicated out-of-band (separately) from the communication session 204. In at least some implementations, for instance, the client security module 116 and the communication service 108 may interact to determine an authentication status of a communication session without handling the media data of the communication session.

Having discussed some example implementation scenarios, consider now a discussion of some example procedures in accordance with one or more embodiments.

Example Procedures

The following discussion describes some example procedures for trust status of a communication session in accordance with one or more embodiments. The example procedures may be employed in the environment 100 of FIG. 1, the system 1100 of FIG. 11, and/or any other suitable environment. In at least some implementations, the steps described for the various procedures can be implemented automatically and independent of user interaction. The procedures, for instance, represent example ways of performing various aspects of the implementation scenarios described above.

Figure 5:
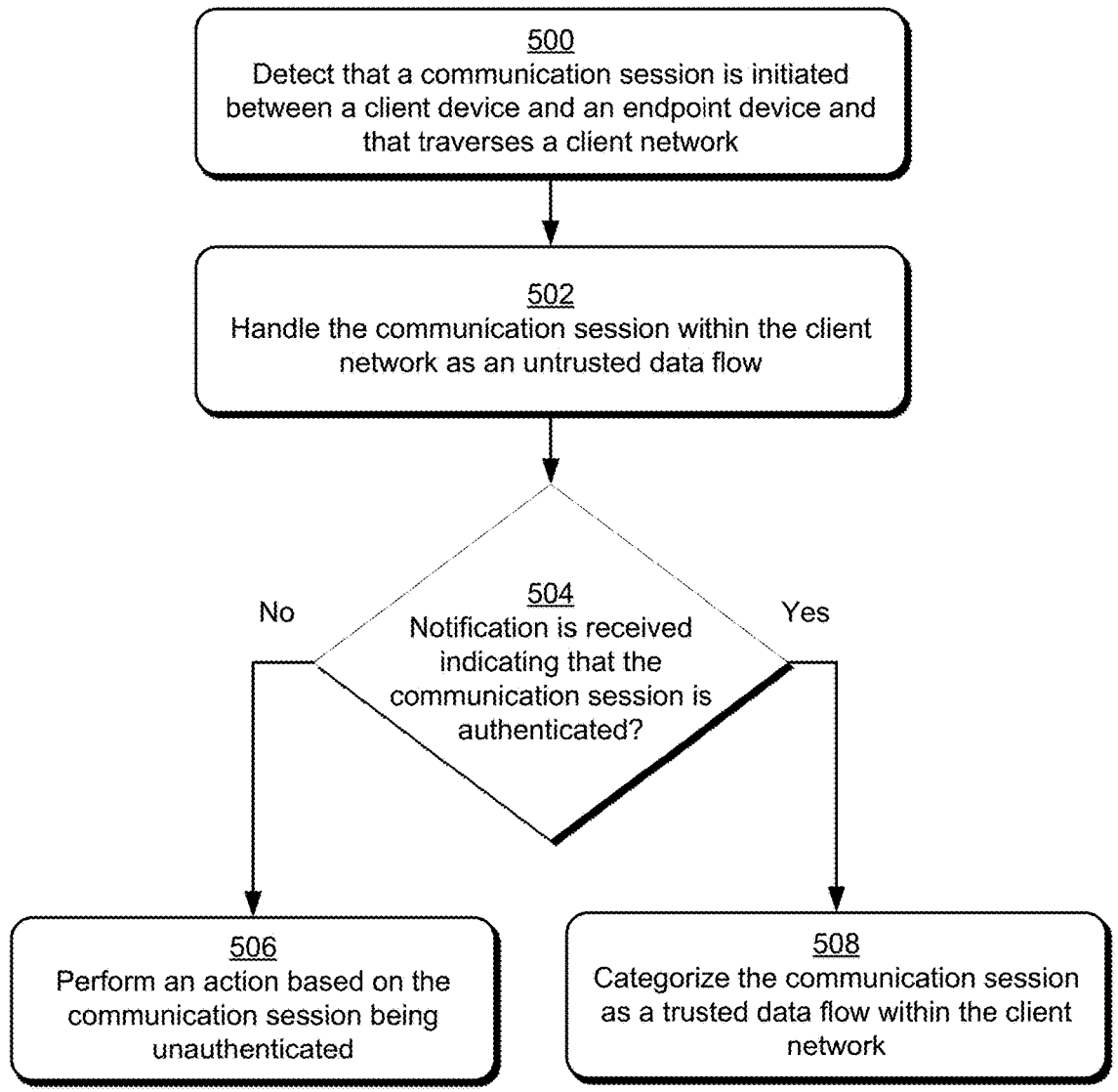
FIG. 5 is a flow diagram that describes steps in a method for handling a data flow of a communication session in accordance with one or more embodiments.

FIG. 5 is a flow diagram that describes steps in a method in accordance with one or more embodiments. The method describes an example procedure for handling a data flow of a communication session in accordance with one or more embodiments.

Step 500 detects that a communication session is initiated between a client device and an endpoint device and that traverses a client network. The client security module 116, for instance, detects that a communication session is initiated between the client device 102 and the endpoint device 110 and traverses the client network 104 to the service network 106.

Step 502 handles the communication session within the client network as an untrusted data flow. For example, the client security module 116 creates an entry in the untrusted list 118 identifying the communication session as an untrusted data flow. Additionally or alternatively, the client security module 116 tags data packets of the communication session as untrusted. In at least some implementations, the 5-tuple information described above is used to identify and track data packets of the communication session. Thus, various network components of the client network 104 route and/or process the data flow of the communication session as an untrusted data flow.

Step 504 ascertains whether a notification is received indicating that the communication session is authenticated. The client security module 116, for instance, ascertains whether a notification is received from the communication service 108 indicating that the communication session 204 is authenticated with the service network 106. In at least some implementations, the client security module 116 waits for specified period of time for the notification, such as five seconds, ten seconds, and so forth.

If a notification indicating that the communication session is authenticated is not received ("No"), step 506 performs an action based on the communication session being unauthenticated. For example, after a specified period of time is elapsed since the initiation of the communication session without receiving a notification that the communication session is authenticated, the client security module 116 determines that the communication session is unauthenticated and thus performs an action that affects the communication session. Examples of different actions include throttling bandwidth allocated to the communication session, terminating the data flow of the communication session within the client network 104, performing a procedure for ascertaining whether the communication session is authenticated, and so forth. One example action is described below.

If a notification indicating that the communication session is authenticated is received ("Yes"), step 508 categorizes the communication session as a trusted data flow within the client network. For instance, in response to receiving the notification, the client security module 116 moves the communication session from the untrusted list 118 to the trusted list 120. Additionally or alternatively, the client security module 116 tags data packets of the communication session as being trusted. Thus, the communication session is handled within the client network 104 as a trusted data flow and thus may be routed unimpeded across the client network 104.

According to various implementations, a notification that a communication session is authenticated can take various forms, such as the session notification 206, a notification generated using the communication API described above, and so forth.

Generally, a trusted data flow is entitled to access privileges within the client network 104 that an untrusted data flow is not. For instance, a trusted data flow is allocated a higher bandwidth limit than an untrusted data flow. Alternatively or additionally, a trusted data flow may be routed over a higher quality routing path within the client network 104 than an untrusted data flow. Routing path quality may be specified in various ways, such as known (e.g., historical) signal quality across a routing path, bandwidth provided by a routing path, data security provided by a routing path, and so forth.

Figure 6:
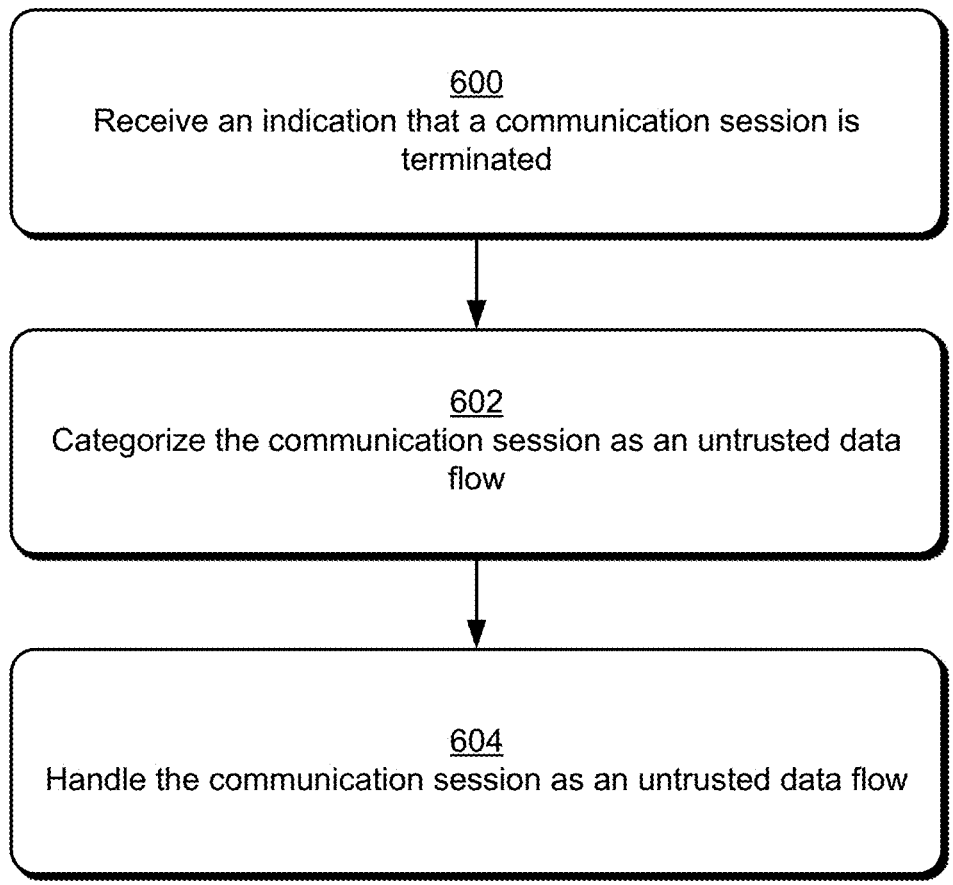
FIG. 6 is a flow diagram that describes steps in a method for termination of a communication session in accordance with one or more embodiments.

FIG. 6 is a flow diagram that describes steps in a method in accordance with one or more embodiments. The method describes an example procedure for termination of a communication session in accordance with one or more embodiments. In at least some implementations, the procedure is an extension of the procedure described above with reference to FIG. 5.

Step 600 receives an indication that a communication session is terminated. For example, the communication session is currently categorized as a trusted data flow, such as described above. The client security module 116, for instance, receives a notification from the communication service 108 that a communication session across the client network 104 is terminated. One example of such a notification is discussed above with reference to the termination notification 302.

Step 602 categorizes the communication session as an untrusted data flow. For example, the client security module 116 moves the communication session from the trusted list 120 to the untrusted list 118.

Step 604 handles the communication session as an untrusted data flow. The client security module 116, for example, handles any subsequent data flow detected as part of the communication session as an untrusted data flow. For instance, bandwidth for the data flow is throttled and/or the data flow is terminated. In at least some implementations, this prevents an unauthorized and/or unauthenticated party from spoofing an authenticated data flow, such as to gain unauthorized access to resources of the client network 104 and/or the service network 106 for malicious purposes.

Figure 7:
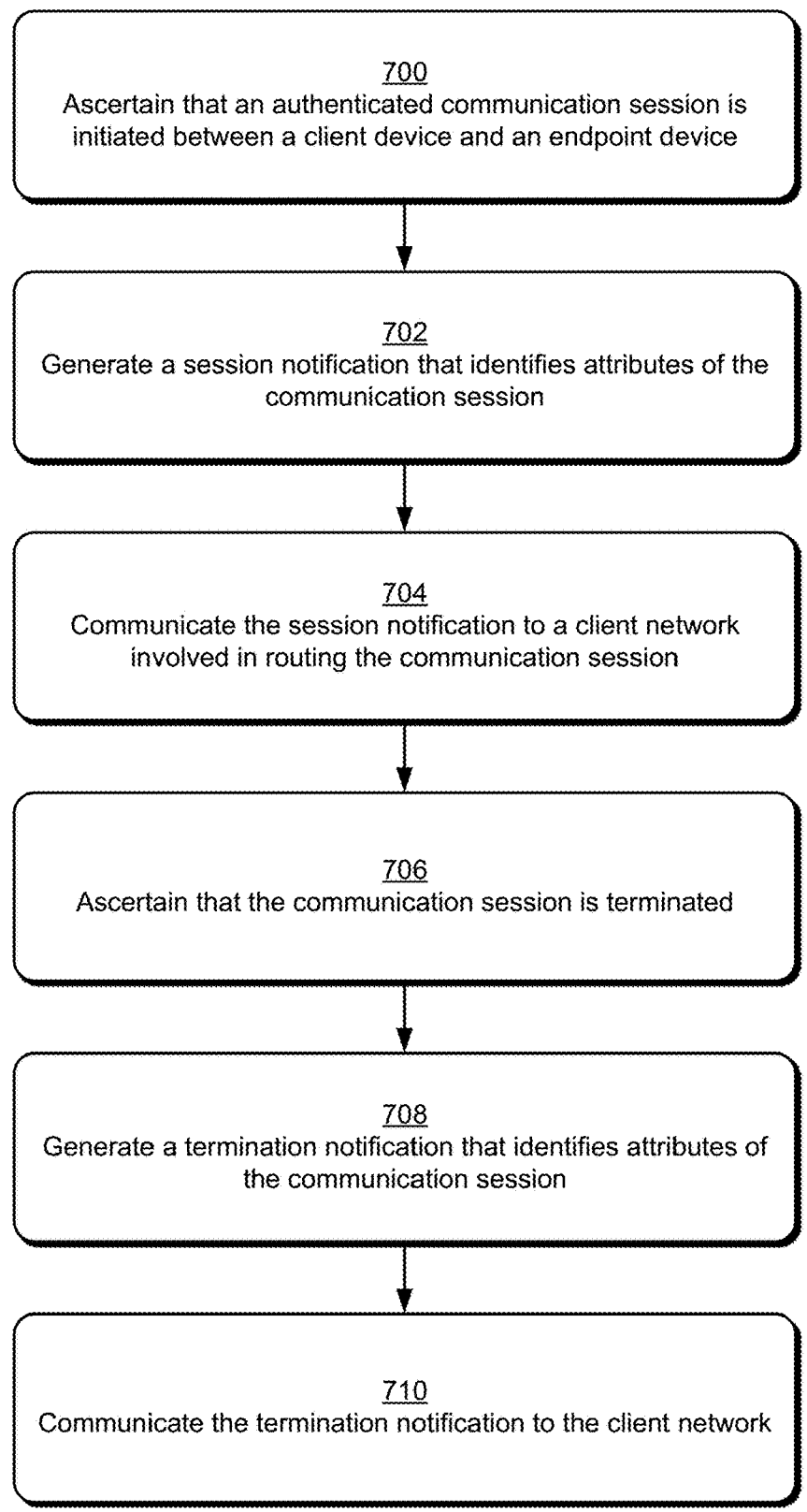
FIG. 7 is a flow diagram that describes steps in a method for communicating a notification of an authentication status of a communication session in accordance with one or more embodiments.

FIG. 7 is a flow diagram that describes steps in a method in accordance with one or more embodiments. The method describes an example procedure for communicating a notification of an authentication status of a communication session in accordance with one or more embodiments.

Step 700 ascertains that an authenticated communication session is initiated between a client device and an endpoint device. The communication service 108, for instance, ascertains that a communication session is initiated between the communication clients 114a, 114b and that the communication client 114a is authenticated with the communication service 108.

Step 702 generates a session notification that identifies attributes of the communication session. For example, the communication service 108 generates the notification, such by populating the notification with values for different attributes described above with reference to the communication API. One example of such a notification is discussed above with reference to the session notification 206.

Step 704 communicates the session notification to a client network involved in routing the communication session. The communication service 108, for example, communicates the notification to the client security module 116 to enable the client network to route the communication session as a trusted data flow. Generally, the notification is communicated separately (e.g., "out-of-band") from a data flow of the communication session. The notification, for instance, represents a web service notification from the communication service 108 to the client security module 116.

Step 706 ascertains that the communication session is terminated. For instance, the communication session 204 detects that user input is received at one or more of the communication clients 114a, 114b to end the communication session.

Step 708 generates a termination notification that identifies attributes of the communication session. For example, the communication service 108 generates the notification, such by populating the notification with values for different attributes described above with reference to the communication API. One example of such a notification is discussed above with reference to the termination notification 302.

Step 710 communicates the termination notification to the client network. The communication service 108, for instance, communicates the termination notification to the client security module 116. As described elsewhere herein, the client security module 116 can utilize the termination notification to recategorize a trusted data flow as an untrusted data flow.

Figure 8:
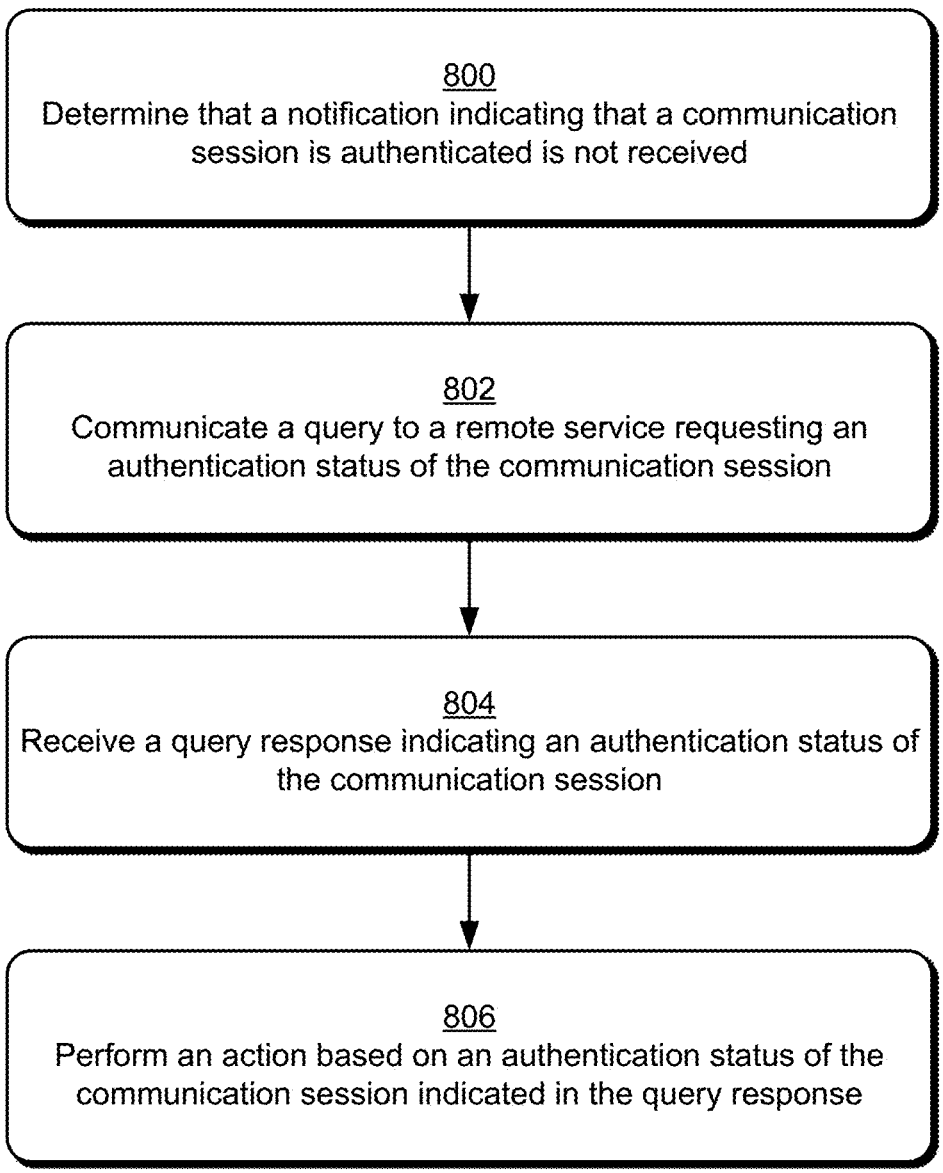
FIG. 8 is a flow diagram that describes steps in a method for verifying whether a communication session is authenticated in accordance with one or more embodiments.

FIG. 8 is a flow diagram that describes steps in a method in accordance with one or more embodiments. The method describes an example procedure for verifying whether a communication session is authenticated in accordance with one or more embodiments. The method, for instance, represents an action that can be taken as described with reference to step 506 of FIG. 5.

Step 800 determines that a notification indicating that a communication session is authenticated is not received. The client security module 116, for instance, ascertains that a notification is not received from the communication service 108 indicating that a communication session across the client network 104 is authenticated with the communication service 108.

Step 802 communicates a query to a remote service requesting an authentication status of the communication session. For example, the client security module 116 generates a query that includes various attributes of the communication session, and communicates the query to the communication service 108. One example of such a query is discussed above with reference to the session query 402. In at least some implementations, the client security module 116 waits for a specified period of time after the communication session is initiated to receive an indication that the communication session is authenticated. After the specified period of time elapses without receiving such a notification, the client security module 116 communicates the query requesting the authentication status.

Step 804 receives a query response indicating an authentication status of the communication session. The client security module 116, for example, receives a query response from the communication service 108 indicating whether the communication session is authenticated.

Step 806 performs an action based on an authentication status of the communication session indicated in the query response. For instance, if the query response indicates that the communication session is authenticated with the communication service 108, the client security module 116 categorizes the communication session as a trusted data flow, such as described above.

However, if the query response indicates that the communication session is not authenticated and/or that an authentication status of the communication session is unknown, the client security module 116 handles the communication session as an untrusted data flow. For instance, bandwidth allocated to the communication session is throttled and/or the data flow of the communication session is terminated.

In at least some implementations, if a response to the query to the remote service is not received, the communication session is handled as an untrusted data flow.

Figure 9:
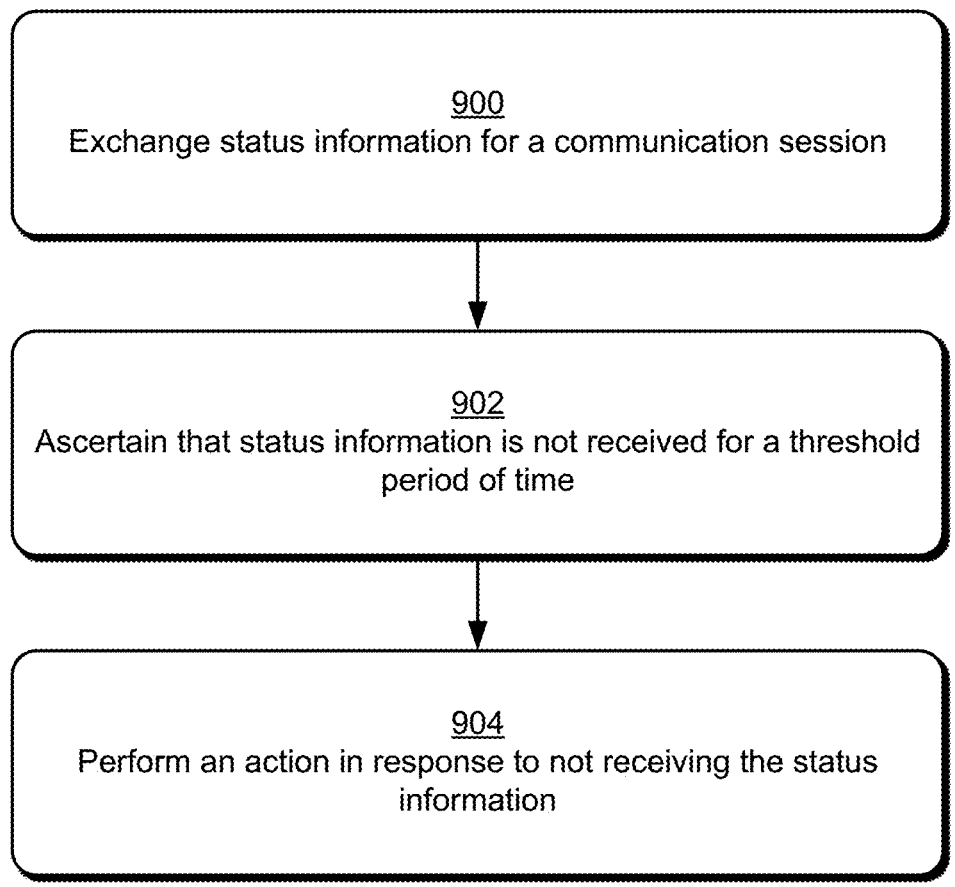
FIG. 9 is a flow diagram that describes steps in a method for exchanging status information for a communication session in accordance with one or more embodiments.

FIG. 9 is a flow diagram that describes steps in a method in accordance with one or more embodiments. The method describes an example procedure for exchanging status information for a communication session in accordance with one or more implementations.

Step 900 exchanges status information for a communication session. The communication service 108, for instance, communicates status information (e.g., keep-alive messages) for a communication session to the client security module 116 and while the communication session is in progress. Alternatively or additionally, the client security module 116 communicates status information (e.g., keep-alive messages) for a communication session to the communication service 108 and while the communication session is in progress. Generally, the status information may include different status attributes of the communication session, such as a current duration of the communication session, session quality detected at devices involved in the communication session, and so forth.

Step 902 ascertains that status information is not received for a threshold period of time. For example, the client security module 116 ascertains that a specified period of time has elapsed since status information for a communication session has been received from the communication service 108. Alternatively or additionally, the communication service 108 ascertains that a specified period of time has elapsed since status information for a communication session has been received from the client security module 116.

Step 904 performs an action in response to not receiving the status information. For instance, in a scenario where the client security module 116 doesn't receive status information from the communication service 108, the client security module 116 can notify the communication service 108 that no status information for the communication session has been received for a specified period of time. In response, the communication service 108 may perform session diagnostics, such as ascertaining whether the communication session was prematurely terminated (e.g., dropped), whether the communication session is experiencing quality problems, and so forth.

In a scenario where the communication service 108 doesn't receive status information from the client security module 116, the communication service 108 can notify the client security module 116 and/or other functionality of the client network 104 that no status information for the communication session has been received for a specified period of time. In response, the client security module 116 and/or other functionality of the client network 104 may perform session diagnostics, such as ascertaining whether the communication session was prematurely terminated (e.g., dropped), whether a component of the client network 104 is experiencing quality problems, and so forth.

Figure 10:
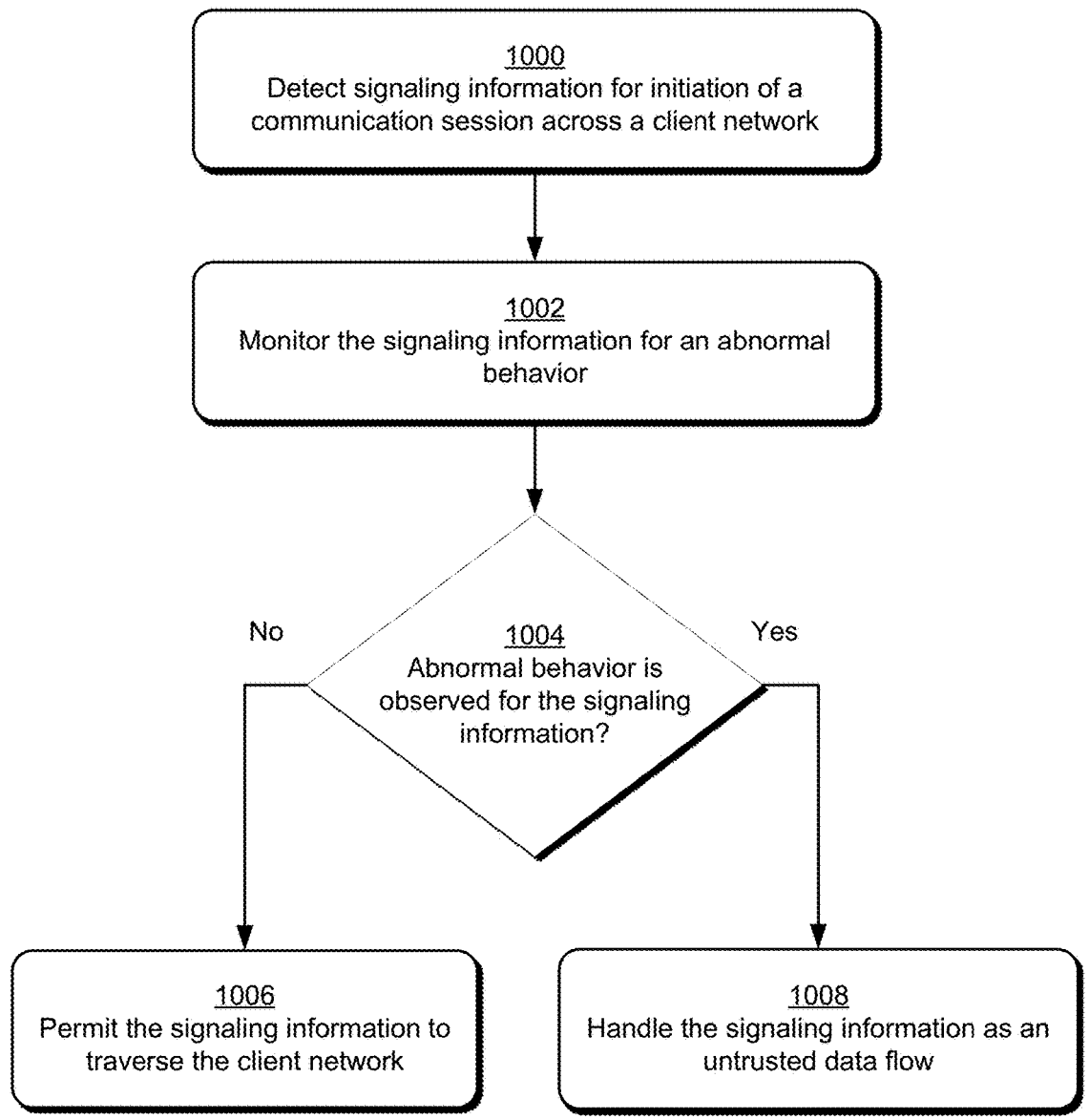
FIG. 10 is a flow diagram that describes steps in a method for monitoring signaling information for a communication session for abnormal behavior in accordance with one or more embodiments.

FIG. 10 is a flow diagram that describes steps in a method in accordance with one or more embodiments. The method describes an example procedure for monitoring signaling information for a communication session for abnormal behavior in accordance with one or more implementations.

Step 1000 detects signaling information for initiation of a communication session across a client network. The client security module 116, for instance, detects signaling information transmitted by the client device 102 across the client network 104 to initiate a communication session with the endpoint device 110. In at least some implementations, the signaling information includes the 5-tuple information described above.

Step 1002 monitors the signaling information for an abnormal behavior. For example, the client security module 116 monitors the signal information for abnormal behavior, such as the signaling information exceeding a specified bandwidth, exceeding a specified data rate, and so forth.

Step 1004 ascertains whether an abnormal behavior is observed for the signaling information. For instance, the client security module 116 ascertains whether the signaling information exhibits an abnormal behavior, such as the signaling information exceeding a specified bandwidth, exceeding a specified data rate, and so forth.

In an event that an abnormal behavior for the signaling information is not observed ("No"), step 1006 permits the signaling information to traverse the client network. For example, the client security module 116 allows the signaling information to traverse the client network 104 unimpeded.

In an event that an abnormal behavior for the signaling information is observed ("Yes"), step 1008 handles the signaling information as an untrusted data flow. For example, the client security module 116 throttles a permitted bandwidth for the signaling information and/or terminates a data flow of the signaling information. As discussed above, abnormal behavior in signaling information can indicate a possible malicious behaviors, such as a DoS attack. Thus, monitoring for abnormal behavior in signaling information and proactively restricting signaling information that exhibits abnormal behavior can limit and/or prevent possible malicious activity.

According to various implementations, the various aspects of the implementations scenarios and procedures described above are performed separately from a data flow of a communication session. For instance, the communication service 108 and the client security module 116 exchange various information pertaining to a communication session with one another and separately from a data flow of the communication session. In at least some implementations, media data of a communication session is encrypted and thus certain intermediate entities such as the client security module 116 may be unable to detect media attributes. Thus, the described out-of-band notifications enable data flows of communication sessions to be intelligently handled without requiring the content of the data flows to be accessible and/or understood.

Accordingly, techniques described herein provide for secure exchange of communication media by enabling communication sessions to be authenticated and for an authenticated status of the communication sessions to be propagated to networks involved in routing and/or handling the communication sessions. Further, communication sessions that are not authenticated can be throttled and/or terminated to protect networks and network components from unauthorized and/or malicious activities.

Having discussed some example procedures, consider now a discussion of an example system and device in accordance with one or more embodiments.

Example System and Device

Figure 11:
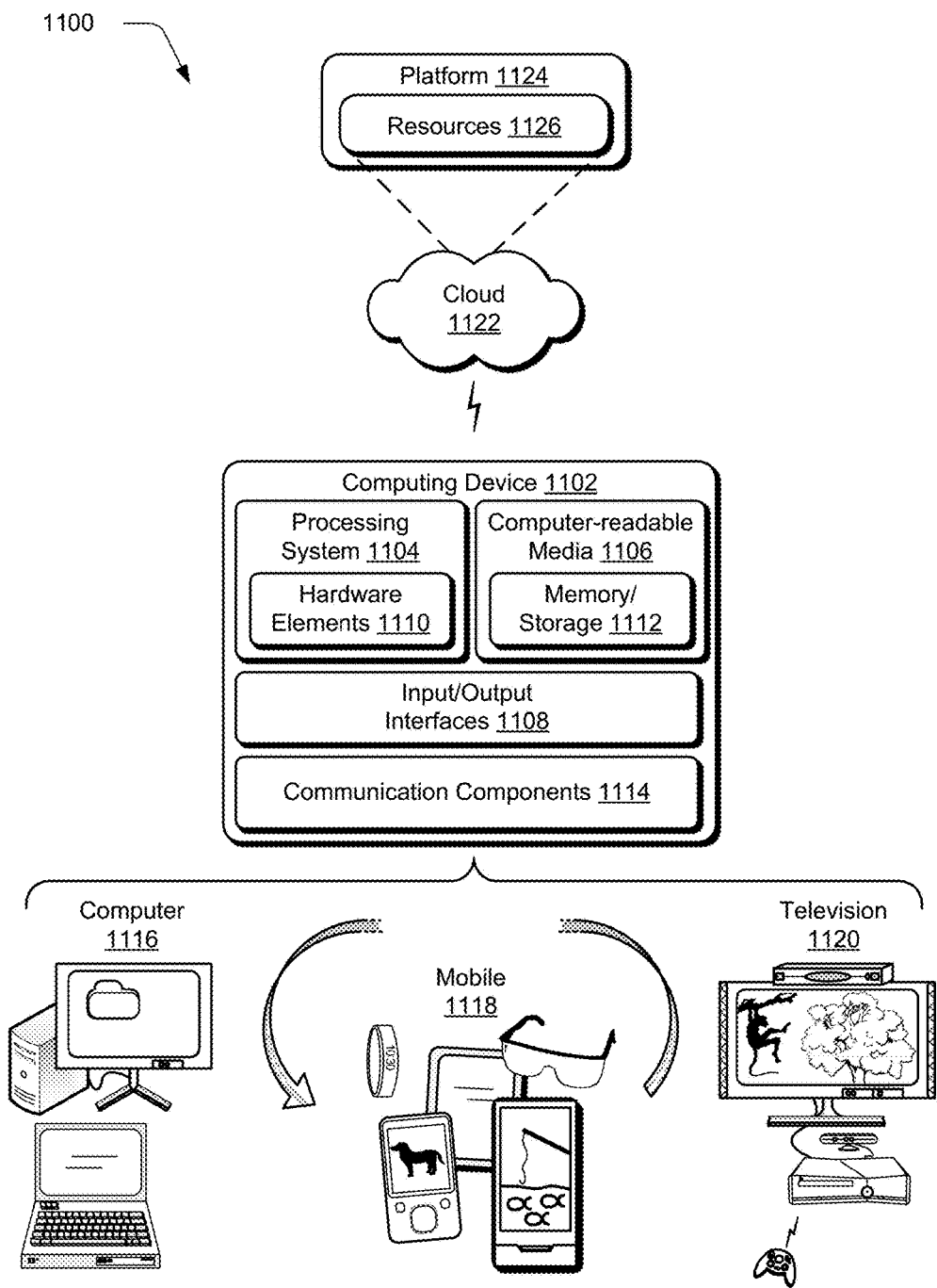
FIG. 11 illustrates an example system and computing device as described with reference to FIG. 1, which are configured to implement embodiments of techniques described herein.

FIG. 11 illustrates an example system generally at 1100 that includes an example computing device 1102 that is representative of one or more computing systems and/or devices that may implement various techniques described herein. For example, the client device 102, the endpoint device 104, the communication service 108, and/or the client security module 116 discussed above with reference to FIG. 1 can be embodied as the computing device 1102. The computing device 1102 may be, for example, a server of a service provider, a device associated with the client (e.g., a client device), an on-chip system, and/or any other suitable computing device or computing system.

The example computing device 1102 as illustrated includes a processing system 1104, one or more computer-readable media 1106, and one or more Input/Output (I/O) Interfaces 1108 that are communicatively coupled one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1106 is illustrated as including memory/storage 1112. The memory/storage 1112 represents memory/storage capacity associated with one or more computer-readable media. The memory/storage 1112 may include volatile media (such as random access memory (RAM)) and/or nonvolatile media (such as read only memory (ROM), Flash memory, optical disks, magnetic disks, and so forth). The memory/storage 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1102 may be configured in a variety of ways as further described below to support user interaction.

The computing device 1102 further includes communication components 1114, which are representative of functionality to receive and transmit data for the computing device 1102. For instance, the communication components 1114 represent components for interfacing and communicating with a network, such as via any suitable wired and/or wireless protocol. According to various implementations, the communication components 1114 receive data transmitted to the computing device 1102 and route the data to one or more other components of the computing device 1102. Further, the communication components 1114 receive data from one or more internal components of the computing device 1102, and cause the data to be communicated to various entities (e.g., devices) remote from the computing device 1102.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1110 and computer-readable media 1106 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of modules that are executable by the computing device 1102 as software may be achieved at least partially in hardware, e.g., through use of computer-readable storage media and/or hardware elements 1110 of the processing system. The instructions and/or functions may be executable/operable by one or more articles of manufacture (for example, one or more computing devices 1102 and/or processing systems 1104) to implement techniques, modules, and examples described herein.

As further illustrated in FIG. 11, the example system 1100 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1100, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1102 may assume a variety of different configurations, such as for computer 1116, mobile 1118, and television 1120 uses. Each of these configurations includes devices that may have generally different constructs and capabilities, and thus the computing device 1102 may be configured according to one or more of the different device classes. For instance, the computing device 1102 may be implemented as the computer 1116 class of a device that includes a personal computer, desktop computer, a multi-screen computer, laptop computer, netbook, and so on.

The computing device 1102 may also be implemented as the mobile 1118 class of device that includes mobile devices, such as a mobile phone, portable music player, portable gaming device, a tablet computer, a wearable device, a multi-screen computer, and so on. The computing device 1102 may also be implemented as the television 1120 class of device that includes devices having or connected to generally larger screens in casual viewing environments. These devices include televisions, set-top boxes, gaming consoles, and so on.

The techniques described herein may be supported by these various configurations of the computing device 1102 and are not limited to the specific examples of the techniques described herein. For example, functionalities discussed with reference to the communication service 108 and the client security module 116 may be implemented all or in part through use of a distributed system, such as over a "cloud" 1122 via a platform 1124 as described below.

The cloud 1122 includes and/or is representative of a platform 1124 for resources 1126. The platform 1124 abstracts underlying functionality of hardware (e.g., servers) and software resources of the cloud 1122. The resources 1126 may include applications and/or data that can be utilized while computer processing is executed on servers that are remote from the computing device 1102. Resources 1126 can also include services provided over the Internet and/or through a subscriber network, such as a cellular or Wi-Fi network.

The platform 1124 may abstract resources and functions to connect the computing device 1102 with other computing devices. The platform 1124 may also serve to abstract scaling of resources to provide a corresponding level of scale to encountered demand for the resources 1126 that are implemented via the platform 1124. Accordingly, in an interconnected device embodiment, implementation of functionality described herein may be distributed throughout the system 1100. For example, the functionality may be implemented in part on the computing device 1102 as well as via the platform 1124 that abstracts the functionality of the cloud 1122.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system for handling a communication session as a trusted data flow within a client network, the system including: at least one processor; and one or more computer-readable storage media including instructions stored thereon that, responsive to execution by the at least one processor, cause the system perform operations including: detecting that a communication session is initiated between a client device and an endpoint device and that traverses a client network to a service network; handling the communication session within the client network as an untrusted data flow; receiving a notification separately from communication session indicating that the communication session is authenticated with the service network; and categorizing, in response to said receiving, the communication session as a trusted data flow within the client network such that the communication session is handled within the client network as a trusted data flow.

Example 2

A system as described in example 1, wherein said handling the communication session as an untrusted data flow includes adding the communication session to an untrusted list for untrusted data flows within the client network.

Example 3

A system as described in one or more of examples 1 or 2, wherein the notification is received after the communication session is established between the client device and the endpoint device.

Example 4

A system as described in one or more of examples 1-3, wherein the operations further include: detecting signaling information as part of initiation of the communication session; and monitoring the signaling information for abnormal behavior.

Example 5

A system as described in one or more of examples 1-4, wherein the operations further include: detecting signaling information as part of initiation of the communication session; and monitoring the signaling information to ascertain whether transmission of the signal information exceeds one or more of a threshold bandwidth or a threshold data rate.

Example 6

A system as described in one or more of examples 1-5, wherein the operations further include, prior to said receiving the notification: determining after a period of time elapses after initiation of the communication session that a notification that the communication session is authenticated is not received; communicating a query to a communication service associated with the service network requesting an authentication status of the communication session; and receiving a query response indicating the authentication status of the communication session, the query response including the notification that the communication session is authenticated.

Example 7

A system as described in one or more of examples 1-6, wherein the operations further include: ascertaining that status information for the communication session is not received from a communication service for a specified period of time; and communicating a notification to the communication service indicating that the status information is not received.

Example 8

A system as described in one or more of examples 1-7, wherein the operations further include: receiving an indication that the communication session is terminated; and recategorizing the communication session as an untrusted data flow.

Example 9

A system as described in one or more of examples 1-8, wherein the system is configured to perform the operations in real-time while the communication session is in progress.

Example 10

A system as described in one or more of examples 1-9, wherein the system is configured to perform the operations without handling the data flow of the communication session.

Example 11

A computer-implemented method for enabling a communication session to be routed within a client network as a trusted data flow, the method including: ascertaining at a communication service that an authenticated communication session is initiated between a client device and an endpoint device; generating a session notification that identifies attributes of the communication session and that indicates that the communication session is authenticated with the communication service; and communicating the session notification to a client network involved in routing the communication session to enable the client network to route the communication session as a trusted data flow.

Example 12

A method as described in example 11, wherein said generating and said communicating are performed while the communication session is in progress.

Example 13

A method as described in one or more of examples 11 or 12, wherein said communicating includes communicating the session notification independently of a data flow of the communication session.

Example 14

A method as described in one or more of examples 11-13, further including communicating periodic status messages to the client network indicating a status of the communication session while the communication session is in progress.

Example 15

A method as described in one or more of examples 11-14, further including: ascertaining that the communication session is terminated; generating a termination notification indicating that the communication session is terminated; and communicating the termination notification to the client network.

Example 16

A computer-implemented method for routing a communication session as a trusted data flow within a client network, the method including: receiving at a client network a notification separately from a communication session indicating that the communication session is authenticated with a service network; categorizing, in response to said receiving, the communication session as a trusted data flow within the client network; and routing the communication session within the client network as a trusted data flow.

Example 17

A method as described in example 16, wherein said receiving includes receiving the notification separately from a data flow of the communication session.

Example 18

A method as described in one or more of examples 16 or 17, further including communicating a query to the service network for an authentication status for the communication session, and wherein said receiving includes receiving the notification as part of a query response.

Example 19

A method as described in one or more of examples 16-18, wherein said categorizing includes recategorizing the communication session from an untrusted data flow to a trusted data flow.

Example 20

A method as described in one or more of examples 16-19, further including: receiving a notification that the communication session is terminated; and recategorizing the communication session as an untrusted data flow within the client network.

CONCLUSION

Techniques for trust status of a communication session are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
    a processor; and,
    a memory in communication with the processor, the memory comprising executable instructions that, when executed by the processor, cause the processor to control the system to perform functions of:
       ascertaining at a communication service that an authenticated communication session is initiated between a client device and an endpoint device, the communication service implementing a service network that is connected to and separate from a client network;
       generating at the communication service a session notification that identifies attributes of the communication session and that indicates that the communication session is authenticated with the communication service; and
       communicating the session notification to the client network involved in routing the communication session, wherein the session notification causes the client network to reroute the communication session from being an untrusted data flow to being a trusted data flow.

2. The system of claim 1, wherein the functions of generating and communicating the session notification are performed while the communication session is in progress.

3. The system of claim 1, wherein, to communicate the session notification to the client network, the instructions further include instructions that, when executed by the processor, cause the processor to control the system to perform a function of communicating the session notification independently of a data flow of the communication session.

4. The system of claim 1, wherein, to generate the session notification, the instructions further include instructions that, when executed by the processor, cause the processor to control the system to perform a function of generating the session notification using an application programming interface (API) that is populated with the attributes of the communication session.

5. The system of claim 1, wherein the instructions further include instructions that, when executed by the processor, cause the processor to control the system to perform a function of communicating periodic status messages to the client network indicating a status of the communication session while the communication session is in progress.

6. The system of claim 1, wherein the instructions further include instructions that, when executed by the processor, cause the processor to control the system to perform functions of:
    receiving a notification from the client network that that no status information for the communication session has been received for a specified period of time; and performing a session diagnostic for the communication session based on the notification.

7. The system of claim 1, wherein the instructions further include instructions that, when executed by the processor, cause the processor to control the system to perform functions of:
ascertaining that the communication session is terminated;
generating a termination notification indicating that the communication session is terminated; and
communicating the termination notification to the client network.

8. The system of claim 1, wherein the instructions further include instructions that, when executed by the processor, cause the processor to control the system to perform functions of:
ascertaining that the communication session is terminated; and
communicating a termination notification to the client network indicating that the communication session is terminated, the termination notification effective to cause the client network to recategorize the communication session from a trusted data flow to an untrusted data flow.

9. A method of operating a system, comprising:
ascertaining at a communication service that an authenticated communication session is initiated between a client device and an endpoint device, the communication service implementing a service network that is connected to and separate from a client network;
generating at the communication service a session notification that identifies attributes of the communication session and that indicates that the communication session is authenticated with the communication service; and
communicating the session notification to the client network involved in routing the communication session, wherein the session notification causes the client network to reroute the communication session from being an untrusted data flow to being a trusted data flow.

10. The method of claim 9, wherein the session notification is generated and communicated to the client network while the communication session is in progress.

11. The method of claim 9, wherein communicating the session notification comprises communicating the session notification independently of a data flow of the communication session.

12. The method of claim 9, further comprising communicating periodic status messages to the client network indicating a status of the communication session while the communication session is in progress.

13. The method of claim 9, further comprising:
ascertaining that the communication session is terminated;
generating a termination notification indicating that the communication session is terminated; and
communicating the termination notification to the client network.

14. The method of claim 9, further comprising:
receiving a notification from the client network that that no status information for the communication session has been received for a specified period of time; and
performing a session diagnostic for the communication session based on the notification.

15. A system comprising:
means for ascertaining at a communication service that an authenticated communication session is initiated between a client device and an endpoint device, the communication service implementing a service network that is connected to and separate from a client network;
means for generating at the communication service a session notification that identifies attributes of the communication session and that indicates that the communication session is authenticated with the communication service; and
means for communicating the session notification to the client network involved in routing the communication session, wherein the session notification causes the client network to reroute the communication session from being an untrusted data flow to being a trusted data flow.

16. The system of claim 15, wherein the session notification is generated and communicated to the client network while the communication session is in progress.

17. The system of claim 15, wherein the communicating means communicates the session notification independently of a data flow of the communication session.

18. The system of claim 15, further comprising means for communicating periodic status messages to the client network indicating a status of the communication session while the communication session is in progress.

19. The system of claim 15, further comprising:
means for ascertaining that the communication session is terminated;
means for generating a termination notification indicating that the communication session is terminated; and
means for communicating the termination notification to the client network.

20. The system of claim 15, further comprising:
means for receiving a notification from the client network that that no status information for the communication session has been received for a specified period of time; and
means for performing a session diagnostic for the communication session based on the notification.

* * * * *